United States Patent [19]
Bardmesser

[11] Patent Number: 6,067,127
[45] Date of Patent: May 23, 2000

[54] METHOD AND APPARATUS FOR REDUCING THE ROTATION RATE OF MIRRORS IN A HIGH RESOLUTION DIGITAL PROJECTION DISPLAY

[75] Inventor: George S. Bardmesser, Woodcliff Lake, N.J.

[73] Assignees: Sony Corporation, Tokyo, Japan; Sony Corporation of America, New York, N.Y.

[21] Appl. No.: 08/889,405

[22] Filed: Jul. 8, 1997

[51] Int. Cl.[7] .................................................. H04N 5/74
[52] U.S. Cl. .......................... 348/782; 348/750; 348/759; 359/205; 359/216
[58] Field of Search .................................... 348/750, 752, 348/754, 756, 759, 762, 202, 203, 204, 205, 782, 758, 757; 359/202, 205, 216, 217, 218, 219; 356/3.16, 3.15; 180/167

[56] References Cited

U.S. PATENT DOCUMENTS

| | | |
|---|---|---|
| 4,479,144 | 10/1984 | Yamazaki et al. . |
| 4,700,237 | 10/1987 | Yoshioka .................................. 358/287 |
| 5,148,285 | 9/1992 | Nakane et al. . |
| 5,150,205 | 9/1992 | Um .......................................... 348/756 |
| 5,170,181 | 12/1992 | Tamada . |
| 5,208,875 | 5/1993 | Virtue et al. . |
| 5,255,082 | 10/1993 | Tamada .................................... 348/750 |
| 5,365,288 | 11/1994 | Dewald .................................... 348/203 |
| 5,475,534 | 12/1995 | Okajima et al. . |
| 5,506,719 | 4/1996 | Murakami ............................... 359/216 |
| 5,534,950 | 7/1996 | Hargis ..................................... 348/750 |
| 5,537,159 | 7/1996 | Suematsu et al. . |
| 5,546,492 | 8/1996 | Ansley .................................... 385/116 |
| 5,691,839 | 11/1997 | Kobayashi .............................. 359/385 |
| 5,751,243 | 5/1998 | Turpin .................................... 342/179 |
| 5,754,260 | 5/1998 | Ooi .......................................... 349/10 |
| 5,805,275 | 9/1999 | Taylor .................................... 356/3.16 |

*Primary Examiner*—Mark R. Powell
*Assistant Examiner*—Wesner Sajous
*Attorney, Agent, or Firm*—Jay H. Maioli

[57] ABSTRACT

A projection display system using a laser beam reflected from a rotating mirror, where the rotation rate of the mirror is reduced. During a first rotational period the beam is reflected from the rotating mirror toward a fixed mirror, reflected from the fixed mirror back to the rotating mirror and then reflected from the rotating mirror toward a viewing surface. During a second rotational period the beam is reflected from the rotating mirror, toward the fixed mirror, reflected from the fixed mirror toward a second fixed mirror, from the second fixed mirror toward a second face of the rotating mirror, reflected from the second face of the rotating mirror toward a third fixed mirror, and reflected from the third fixed mirror toward the viewing surface.

3 Claims, 2 Drawing Sheets

METHOD AND APPARATUS FOR REDUCING THE ROTATION RATE OF MIRRORS IN A HIGH RESOLUTION DIGITAL PROJECTION DISPLAY

BACKGROUND OF THE INVENTION

1. Field of the Invention

This invention relates generally to the field of projection display systems. More particularly, this invention relates to a projection display system where a modulated laser beam is scanned across a surface by rotating mirrors and where areas of the surface illuminated by the laser form pixels of a video image.

2. Description of Related Art

The present invention is an improvement to a projection display device disclosed in a co-pending application, 7229/53235, U.S. patent application Ser. No. 08/854,872. In that device, a modulated laser is scanned across a viewing surface by vertical and horizontal scanning rotating mirrors. A video signal is used to modulate the intensity of the laser. The laser beam is first reflected from the vertical scanning mirror to position the beam for scanning along a particular horizontal scan line. The beam is then reflected from the horizontal scanning mirror to scan the beam across the viewing surface.

Such a system is an improvement over known projection displays because the resolution and aspect ratio of the scanned image can be dynamically adjusted. Also, by using intense laser light sources, images can be projected on large viewing surfaces to create, for example, outdoor displays.

That system suffers from the problem that the rotation rate for the horizontal scanning mirror must be very high in order to properly display a video signal. For example, to display an NTSC video signal with 330 horizontal scan lines per field at a rate of 30 fields per second, a sixteen-sided rotating mirror must rotate over 600 times per second.

High rotation rates make this system susceptible to wear and vibration. Also, the radial dimension of the horizontal mirror must be small, so that the centripetal forces on the mirror do not distort its reflective surfaces. Use of small mirrors requires precise alignment of the optical components. Construction and maintenance of this precise alignment increases the cost and reduces the reliability of the system.

Rotation rates can be reduced by using additional laser sources and scanning them in parallel, as was suggested in the above mentioned application. Additional lasers, however, add cost to the system and increase the complexity of the controlling electronics. This is a particular problem where high-intensity lasers must be used since these lasers are costly and require complicated high-energy power supplies.

OBJECTS AND SUMMARY OF THE INVENTION

In view of the above mentioned shortcomings of known projection screen display devices, it is an object of the present invention to provide a display device wherein a modulated laser beam is scanned across a viewing surface by a system of rotating mirrors and wherein the rotation rate of at least one scanning mirror is reduced.

It is another object of the present invention to provide a high-definition projection display device using a laser scanned by a system of rotating mirrors with a reduced mirror rotation rate using a minimum number of modulated laser light sources.

According to an aspect of the present invention there is provided a laser light source modulated by a video signal for producing a modulated laser beam, a vertical scanning mirror for scanning the beam in a vertical direction, a horizontal scanning mirror, a first fixed mirror for reflecting the beam, during a first rotational period back toward the rotating mirror where it is then reflected toward a viewing surface and in a second rotational period for reflecting the beam toward a second fixed mirror, the second fixed mirror reflecting the beam toward a second face of the horizontal rotating mirror, a third fixed mirror for receiving the beam reflected by the second face of the rotating mirror and reflecting the beam toward the viewing surface. The beam is scanned two times for each face of the rotating mirror, so that the rotational rate of the horizontal scanning mirror is reduced by half.

DETAILED DESCRIPTION OF PREFERRED EMBODIMENTS

Figure 1:
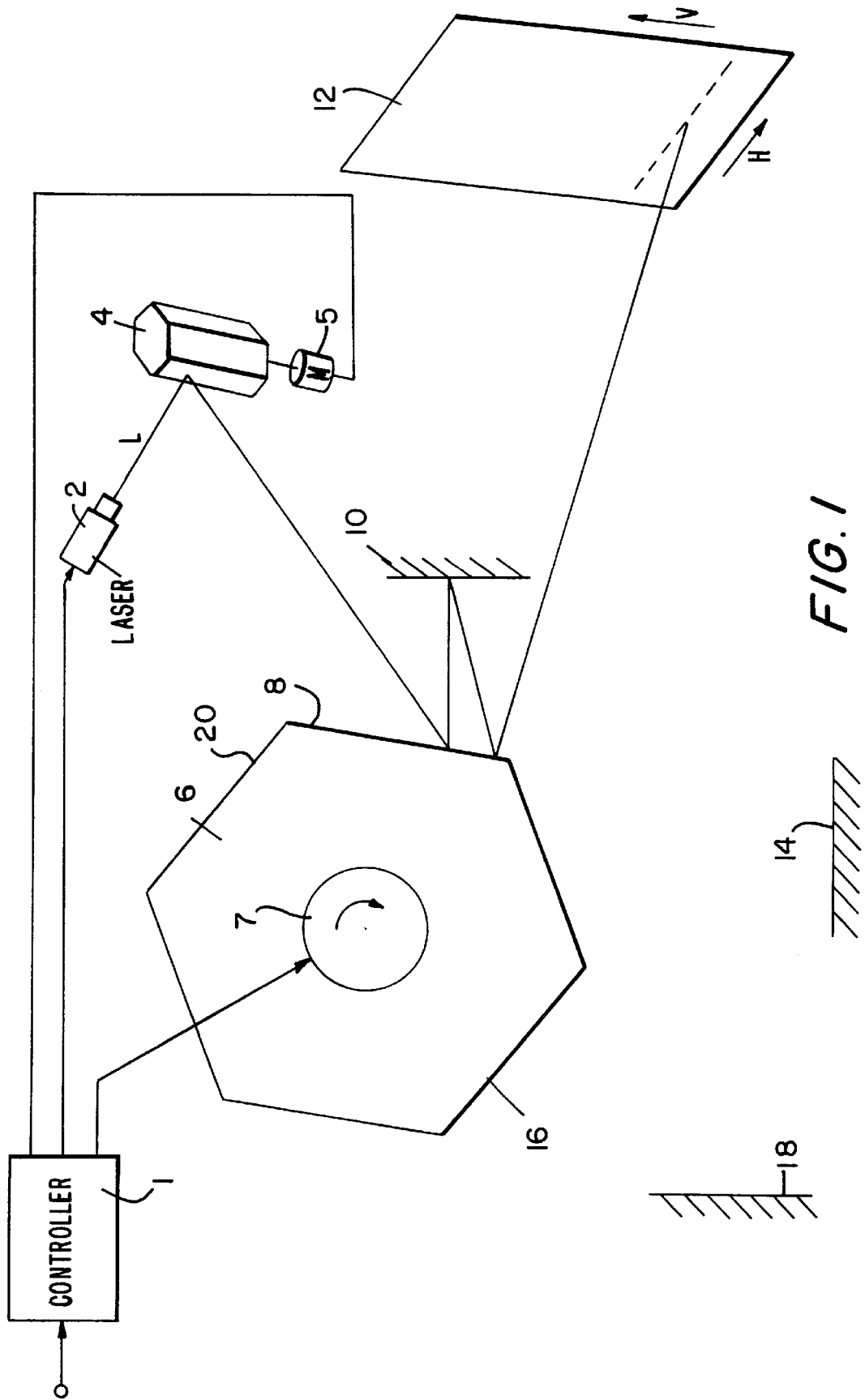
FIG. 1 shows a view of an embodiment of the present invention along the rotational axis of a horizontal scanning mirror during a first rotational period.

FIG. 1 shows an embodiment of the present invention, in which a laser light source 2 produces a modulated laser beam L that has an intensity controlled by a controller 1. The intensity of the laser beam depends on the instantaneous intensity of a video signal from a video source (not shown) that is connected to the controller 1. The beam L reflects from a vertical scan rotating mirror 4 and strikes a first face 8 of a horizontal scan rotating mirror 6. The vertical scan mirror 4 and horizontal scan mirror 6 are rotated by a vertical motor 5 and a horizontal motor 7, respectively, under the control of the controller 1.

During a first rotational period the beam L strikes a lower portion of the first face 8 of the horizontal scan mirror 6 as shown in FIG. 1 and is reflected toward a first fixed mirror 10. The beam L is reflected from the fixed mirror 10, back to the face 8 of the horizontal scan mirror 6 and then toward the viewing surface 12. Rotation of the horizontal scan mirror 6 causes the point on the viewing surface 12 illuminated by the beam to scan in the direction of arrow H.

Figure 2:
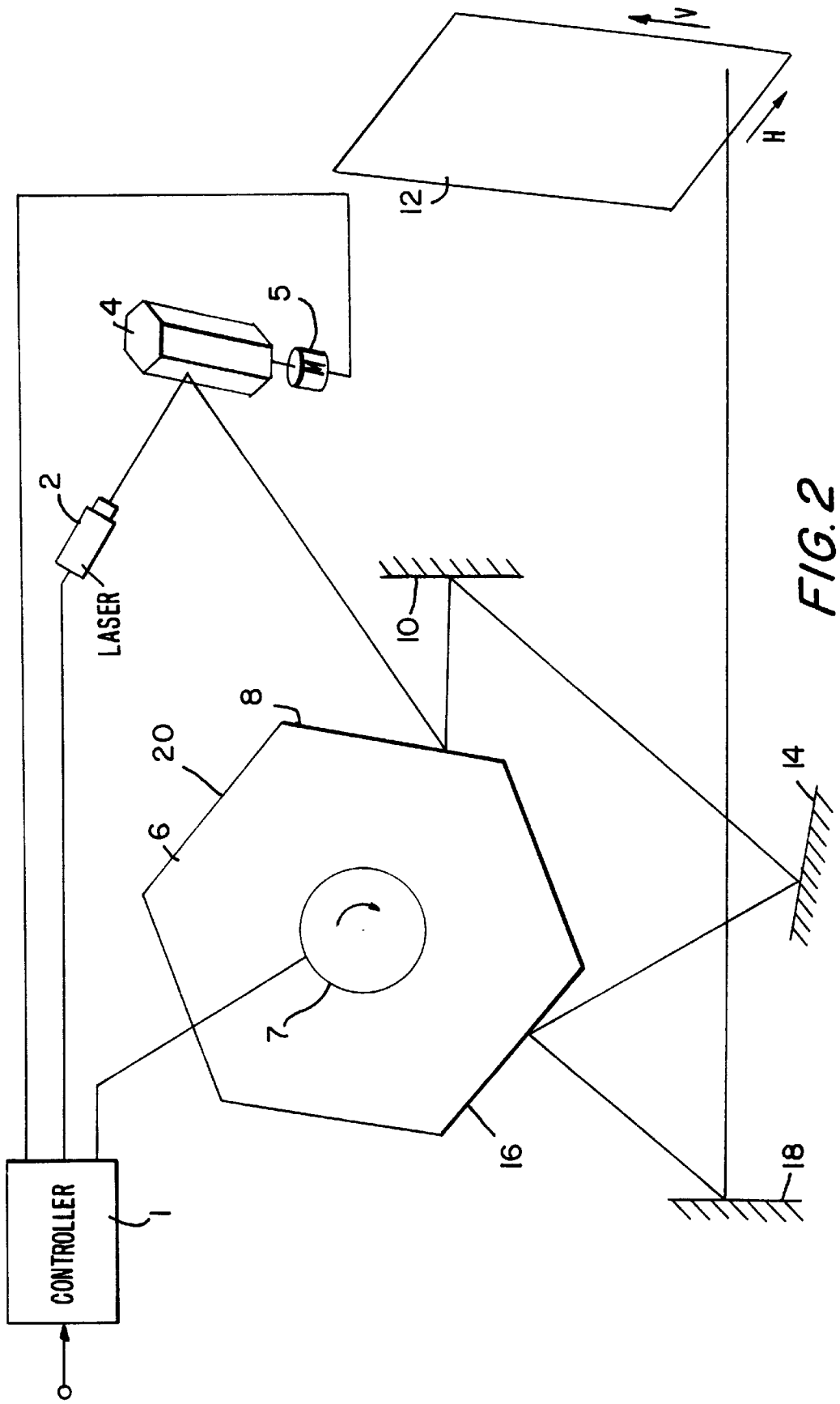
FIG. 2 shows a view of an embodiment of the present invention along the rotational axis of a horizontal scanning mirror during a second rotational period.

During a second rotational period, shown in FIG. 2, the horizontal mirror 6 has rotated so that the beam L strikes the upper portion of the face 8 of the horizontal scan mirror 6 and is reflected toward the first fixed mirror 10. The beam L is then reflected toward a second fixed mirror 14 and then toward a second face 16 of the rotating mirror 6. The beam L is reflected from the second face 16 toward a third fixed mirror 18 that reflects the beam L toward the viewing surface 12. Again, rotation of the horizontal scan mirror 6 during the second rotational phase causes the point on the viewing surface 12 illuminated by the beam L to scan in the direction of arrow H.

The horizontal mirror 6 continues to rotate and a succeeding face 20 of the horizontal scan mirror 6 takes the place of the first face 8. The process is repeated for each succeeding face of the horizontal scan mirror 6.

During each rotational period the vertical scan mirror 4 displaces the beam L in the vertical direction of arrow V shown in FIGS. 1 and 2, so that each horizontal scan during the first and second rotational periods are separated by a distance that corresponds with the vertical resolution of the displayed video image.

As illustrated above, the beam L is scanned across the viewing surface 12 once for each rotational period of each face of the horizontal scan mirror 6. As a result, the rotational velocity of the horizontal scan mirror 6 can be reduced by half. Since the beam is reflected twice from the rotating horizontal scan mirror 6, during both the first and second rotational periods, the velocity of the beam across the viewing surface 12 is twice that for a beam reflected only once from a rotating mirror. Thus, the beam L can be scanned across the entire width of the viewing surface 12 in half the time.

The embodiments described above are illustrations of the present invention. Those skilled in the art can vary the above embodiments while remaining within the spirit and scope of the present invention that is defined by the appended claims.

What is claimed is:

1. A display apparatus comprising:

a viewing surface;

a laser light source for producing a laser beam with a modulated intensity;

a first rotating mirror for reflecting said laser beam and scanning said beam through a range of vertical angles at a first rotation rate;

a second rotating mirror comprised of a plurality of reflective faces for receiving said laser beam reflected from said first rotating mirror through said range of vertical angles on a first reflective face and for reflecting said laser beam and scanning said beam through first and second ranges of horizontal angles in respective first and second rotational periods at a second rotation rate;

a first fixed mirror for receiving said beam reflected through said first and second ranges of horizontal angles, for reflecting said beam in said first range of horizontal angles during said first rotational period toward the first face of said second rotating mirror, whereby said beam is reflected from said first face of said second rotating mirror toward said viewing surface and for reflecting said beam in said second range of horizontal angles during said second rotational period through a third range of horizontal angles;

a second fixed mirror for receiving said beam reflected through said third range of horizontal angles and for reflecting said beam toward a second face of said second rotating mirror, whereby said beam is reflected by said second face of said second rotating mirror and scanned through a fourth range of horizontal angles; and a third fixed mirror for receiving said beam reflected through said fourth range of horizontal angles and for reflecting said beam toward said viewing surface, whereby rotation of said second rotating mirror causes said beam to scan across said viewing surface once during said first rotational period and once during said second rotational period.

2. The apparatus according to claim 1 further comprising control means for controlling the intensity of the laser light source and for receiving a video signal, wherein the modulation of said intensity corresponds with instantaneous values of said video signal and whereby rotation rates of said first and second rotating mirrors are adjusted so that scanning through said ranges of vertical and horizontal angles corresponds with a scanning pattern of said video signal.

3. A method for reducing a rotation rate of a scanning mirror in a projection display apparatus comprising the steps of:

generating a laser light beam;

vertically scanning said light beam through a range of vertical angles;

reflecting said light beam from a first face of a rotating mirror in a first rotational position toward a first fixed mirror;

reflecting said light beam from said fixed mirror toward said first face of said rotating mirror, whereby said beam is reflected toward a viewing surface;

rotating said rotating mirror to a second rotational position;

reflecting said beam from said first face toward said first fixed mirror;

reflecting said beam from said first fixed mirror toward a second fixed mirror;

reflecting said beam from said second fixed mirror toward a second face of said rotating mirror;

reflecting said beam from said second face of said rotating mirror toward a third fixed mirror; and reflecting said beam from said third fixed mirror toward said viewing surface.

\* \* \* \* \*